(12) United States Patent
Arditty et al.

(10) Patent No.: US 10,454,205 B2
(45) Date of Patent: Oct. 22, 2019

(54) UNDERWATER CONNECTOR HALF AND UNDERWATER CONNECTOR COMPRISING SUCH A CONNECTOR HALF

(71) Applicants: IXBLUE, Saint-Germain-en-Laye (FR); DCNS, Paris (FR)

(72) Inventors: Herve Arditty, Chambourcy (FR); Frederic Lelidec, Louveciennes (FR)

(73) Assignees: IXBLUE, Saint-Germain-en-Laye (FR); DCNS, Paris (FR)

( * ) Notice: Subject to any disclaimer, the term of this patent is extended or adjusted under 35 U.S.C. 154(b) by 94 days.

(21) Appl. No.: 15/643,680

(22) Filed: Jul. 7, 2017

(65) Prior Publication Data
US 2018/0013227 A1 Jan. 11, 2018

(30) Foreign Application Priority Data

Jul. 8, 2016 (FR) ...................................... 16 56609

(51) Int. Cl.
| | | |
|---|---|---|
| *H01R 13/52* | (2006.01) | |
| *G02B 6/38* | (2006.01) | |
| *H01R 24/58* | (2011.01) | |
| *H01R 3/08* | (2006.01) | |
| *H01R 13/523* | (2006.01) | |

(Continued)

(52) U.S. Cl.
CPC ....... *H01R 13/5216* (2013.01); *G02B 6/3816* (2013.01); *G02B 6/3817* (2013.01); *H01R 3/08* (2013.01); *H01R 13/523* (2013.01); *H01R 13/5219* (2013.01); *H01R 24/58* (2013.01); *H01R 43/005* (2013.01); *H01R 2107/00* (2013.01)

(58) Field of Classification Search
CPC ...... G02B 6/3816; G02B 6/3817; H01R 3/08; H01R 13/5219
See application file for complete search history.

(56) References Cited

U.S. PATENT DOCUMENTS

| | | | |
|---|---|---|---|
| 3,665,509 A | 5/1972 | Elkins | |
| 4,425,017 A * | 1/1984 | Chan | ..................... C08K 5/098 252/572 |

(Continued)

FOREIGN PATENT DOCUMENTS

| | | |
|---|---|---|
| CA | 2 722 135 A1 | 4/2009 |
| GB | 1 498 612 A | 1/1978 |

OTHER PUBLICATIONS

McCartney et al., "High-Power Electromechanical Cable Connectors for Deep Ocean Applications", Civil Engineering Laboratory Naval Construction Battalion Center, Sponsored by Naval Facilities Engineering Command, Port Hueneme, California 93043.

(Continued)

*Primary Examiner* — Abdullah A Riyami
*Assistant Examiner* — Nader J Alhawamdeh
(74) *Attorney, Agent, or Firm* — Young & Thompson

(57) ABSTRACT

An underwater connector half includes a base and at least two electrical connection terminals respectively connected to two electric wires received in at least one cable. The two electrical connection terminals are ring-shaped and coaxial about an axis located along a direction of assembly of a complementary connector half and the base has a side wall that is parallel to the axis and through which passes the cable. An underwater connector including such a connector half is also disclosed.

20 Claims, 6 Drawing Sheets

(51) Int. Cl.
  *H01R 107/00*    (2006.01)
  *H01R 43/00*     (2006.01)

(56) References Cited

U.S. PATENT DOCUMENTS

| | | | |
|---|---|---|---|
| 4,666,242 A * | 5/1987 | Cairns | G02B 6/3816 |
| | | | 385/69 |
| 5,174,765 A | 12/1992 | Williams et al. | |
| 2018/0013228 A1* | 1/2018 | Arditty | H01R 13/5216 |

OTHER PUBLICATIONS

FR Search Report, dated Feb. 3, 2017, from corresponding FR1656609 application.

* cited by examiner

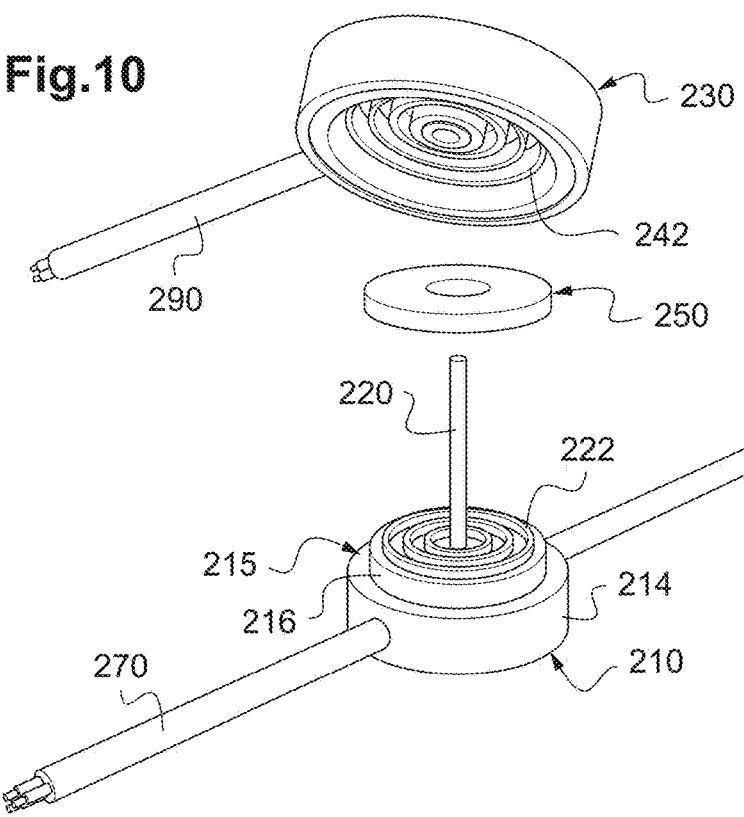
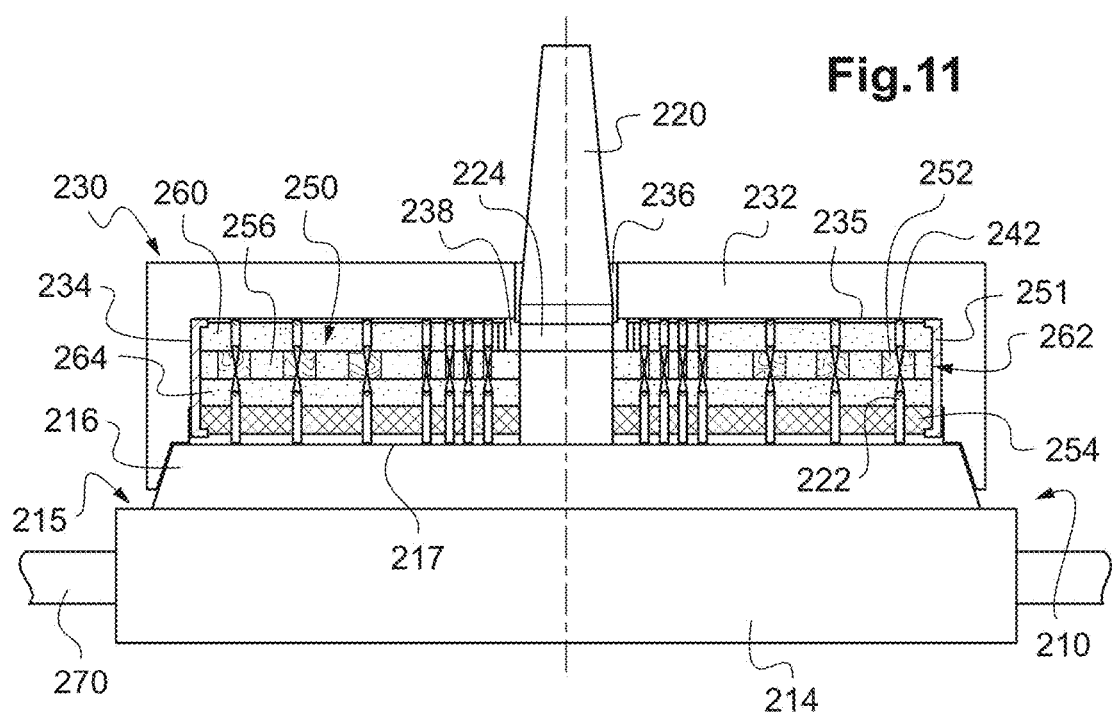

UNDERWATER CONNECTOR HALF AND UNDERWATER CONNECTOR COMPRISING SUCH A CONNECTOR HALF

TECHNICAL FIELD OF THE INVENTION

This invention relates in general to the connection of underwater cables intended, for example, to transport the electricity generated by marine turbines.

It more particularly concerns an underwater connector half and an underwater connector comprising such a connector half.

TECHNOLOGICAL BACKGROUND

Underwater connectors that can be connected underwater, a property sometimes referred to as "wet-mate", are known.

In known devices, the coupling of two complementary connectors requires the precise alignment of one connector in relation to the other along a horizontal axis and the application of opposing horizontal forces to connect the two connectors.

Such a design requires the use of 5-degree-of-freedom alignment mechanisms for coaxial connectors and 6-degree-of-freedom alignment mechanisms for pin connectors. Other mechanisms can also be provided for applying horizontal connection forces.

For this purpose, known connectors are complex and the making of a connection by coupling two connectors is a delicate procedure. The connection acquisition costs and connecting costs are therefore high.

PURPOSE OF THE INVENTION

In this context, the present invention proposes an underwater connector half comprising a base and at least two electrical connection terminals respectively connected to two electric wires received in at least one cable, characterised in that the two electrical connection terminals are ring-shaped and coaxial about an axis located along a direction of assembly of a complementary connector half and in that the base has a side wall that is parallel to said axis and through which passes said cable.

Given that the cable is generally routed along the seabed, such an underwater connector half is particularly well suited to being laid on this seabed with a vertical direction of assembly of the complementary connector half, which simplifies the assembly of the complementary connector half through gravity.

According to optional characteristics that can be taken into consideration (and therefore not limiting the invention):
the electrical connection terminals are located on the outer surface of an axial pile;
the axial pile is cylindrical or, according to another embodiment, is conical;
the axial pile has a tip-shaped free end;
the electrical connection terminals are concentric;
a centring rod extends along said axis;
the connector half comprises an optical connection system connected to an optical fibre received in said cable;
the optical connection system comprises at least one first optical ring half designed to engage with a second optical ring half of the complementary connector half.

The invention further proposes an underwater connector comprising a connector half as disclosed hereinabove, said complementary connector half and a gel cartridge inserted between said connector halves.

According to optional characteristics that can be taken into consideration (and therefore not limiting the invention):
the gel cartridge is housed in a housing formed in a body of the complementary connector half;
the gel cartridge is pierced by the axial pile;
the gel cartridge is pierced by the electrical connection terminals;
the complementary connector half comprises an electrical connection terminal;
the gel cartridge comprises at least one conductive track submerged in an insulating gel;
an electrical connection is made between the electrical connection terminal of the complementary connector and one of said two ring-shaped electrical connection terminals via the conductive track;
the conductive track is formed by a conductive gel;
the conductive track is formed by a layer of conductive gel inserted between two layers of insulating gel;
the conductive track is a ring made of conductive gel submerged in the insulating gel;
the conductive track is formed by a conductive elastomer;
a metal toroid in contact with the conductive track is placed in contact with said ring-shaped electrical connection terminal;
the conductive track and the metal toroid are mounted on an elastic structure submerged in the insulating gel.

DETAILED DESCRIPTION OF AN EMBODIMENT

The description hereinbelow, provided with reference to the accompanying figures, which are given as non-limiting examples, shall clearly describe the components of the invention and how it can be produced.

In the accompanying figures:

FIG. 10 is a perspective view of a third example of a connector according to the invention;

FIG. 11 is a sectional view of the connector in FIG. 10;

Figure 1:
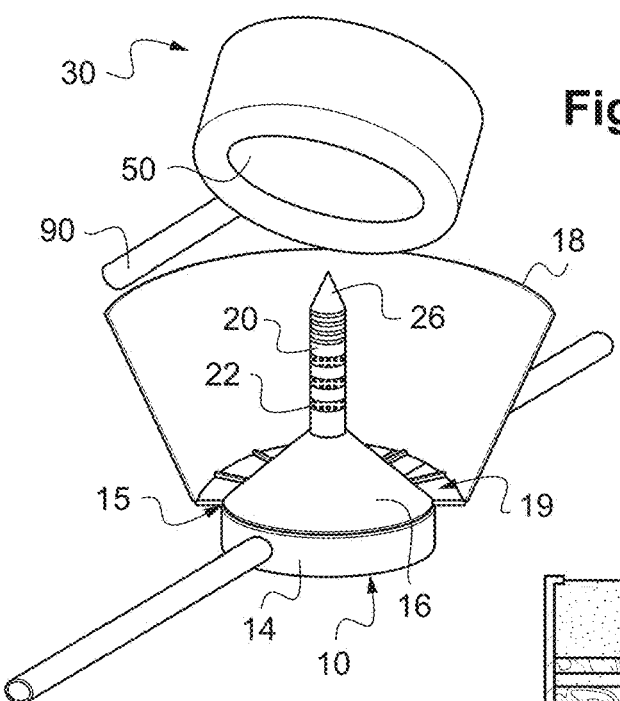
FIG. 1 is a perspective view of a first example of an underwater connector according to the invention.

Different embodiments of an underwater connector according to the invention will now be described.

In general, as shown in FIGS. 1, 2, 6, 7, 10 and 11, such an underwater connector comprises a lower connector half 10, 110, 210, an upper connector half 30, 130, 230, and a gel cartridge 50, 150, 250 inserted between the two connector halves and used to make an interconnection (in particular an electric interconnection) between said two connector halves, as explained hereinbelow.

The lower connector half 10, 110, 210 comprises a base 14, 114, 214 intended to be laid on the seabed (and generally secured thereto).

The base 14, 114, 214 comprises a vertical side wall, through which passes a cable 70, 170, 270 also laid on the seabed and housing a plurality of electric wires, in addition to optical fibres.

The base 14, 114, 214 bears an axial element 20, 120, 220, which extends substantially vertically when the base 14, 114, 214 is laid on the seabed.

The lower connector half 10, 110, 210 has ring-shaped connection terminals (or electrical contacts) 22, 122, 222 that are coaxial about an assembly axis parallel to the axial element 20, 120, 220 (and even, in the embodiments described herein, combined with said axial element 20, 120, 220).

The connection terminals 22, 122, 222 are respectively electrically connected to the electric wires received in the aforementioned cable 70, 170, 270.

The upper connector half 30, 130, 230 is connected to a liftable cable 90, 190, 290, also housing electric wires and optical fibres.

The upper connector half 30, 130, 230 has ring-shaped and coaxial connection terminals (or electrical contacts) 42, 142, 242, respectively connected to electric wires housed in the liftable cable 90, 190, 290.

Figure 3:
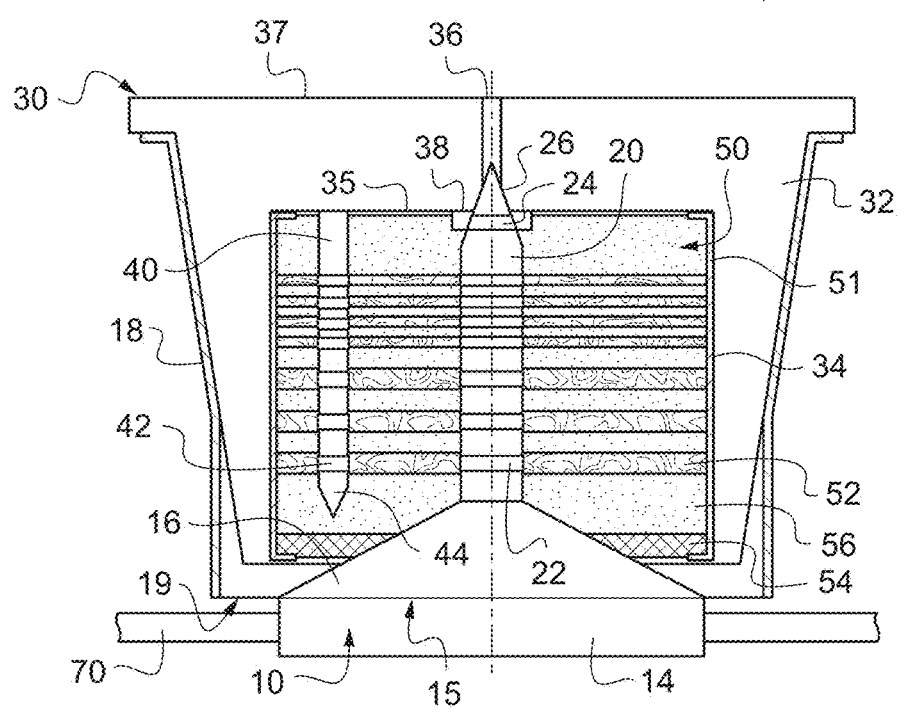
FIG. 3 is a sectional view of a gel cartridge used in the connector in FIG. 1.
Figure 8:
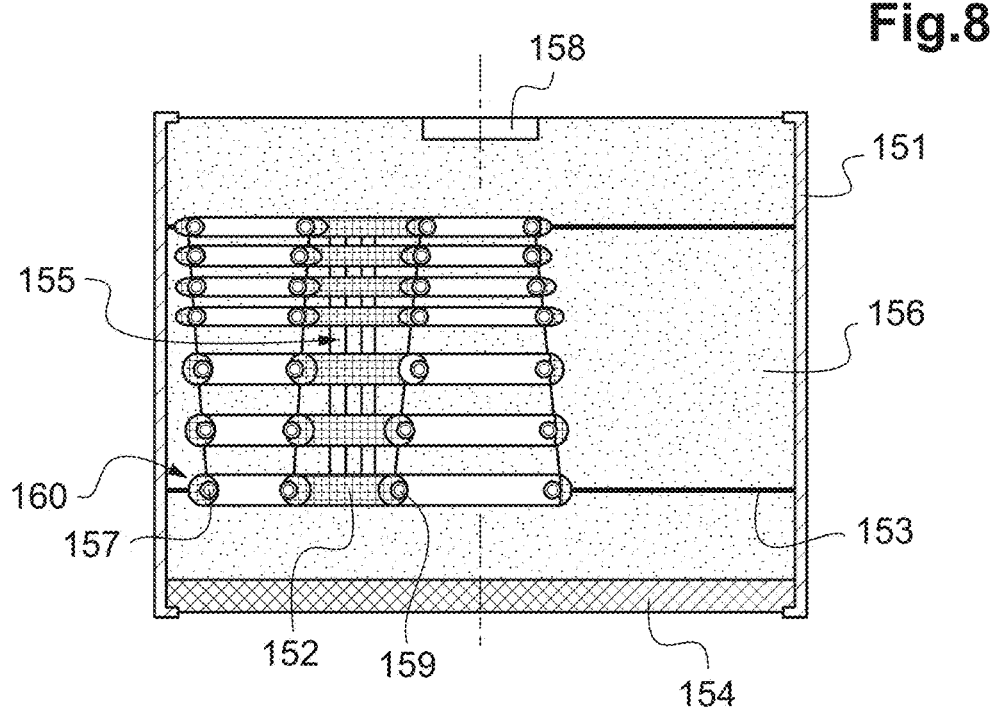
FIG. 8 is a view of a vertical cross-section of a gel cartridge used in the connector in FIG. 6.
Figure 12:
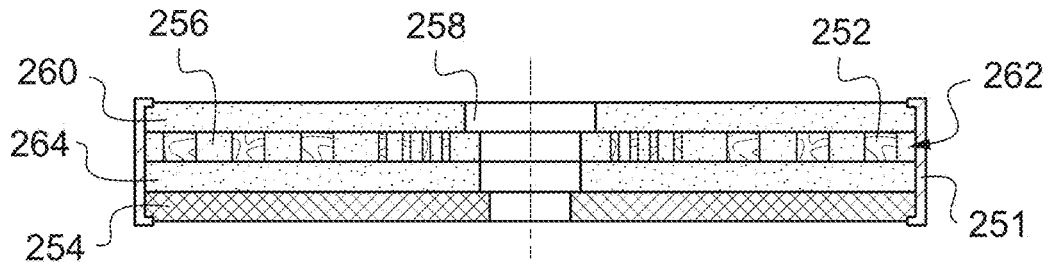
FIG. 12 is a sectional view of a gel cartridge used in the connector in FIG. 10.

The gel cartridge 50, 150, 250 comprises, inside a rigid outer case 51, 151, 251, an (electrically) insulating gel 56, 156, 256 and conductive tracks 52, 152, 252 submerged in the insulating gel 56, 156, 256, as shown in particular in FIGS. 3, 8 and 12.

The gel 56, 156, 256 is, in this case, a thixotropic gel, for example a MAGIC GEL supplied by the RAY TECH company. Thanks to its thixotropy, such a gel 56, 156, 256 becomes restructured (after a given lapse of time and without external intervention) after being subjected to a stress.

The gel 56, 156, 256 furthermore has an operating temperature that is for example in the range −60° C. to +200° C. and water-resistant when submerged.

The insulating gel used 56, 156, 256 has, for example, a dielectric strength greater than 1,000 V/mm and a volume resistance greater than 20 GΩ·cm.

As explained in more detail hereinbelow for each of the embodiments, each conductive track 52, 152, 252 is designed to make the connection between a connection terminal 22, 122, 222 of the lower connector half 10, 110, 210 and a corresponding connection terminal 42, 142, 242 of the upper connector half 30, 130, 230, which produces a functional connection (from an electrical perspective) without requiring the very precise relative positioning of the two connector halves.

According to a first embodiment, shown in FIGS. 1 to 5, the base 14 comprises a cylindrical side wall (through which passes the cable 70 laid on the seabed) and forms a part of a baseplate 15, further comprising a frustoconical upper portion 16, at the top of which is located the axial element, in this case a pile 20 having an overall cylindrical shape.

The upper end of the pile 20 ends in a tip 26, which houses a first optical assembly 24 comprising first optical ring halves 302.

The ring-shaped connection terminals 22 are placed on the outer surface of the cylindrical pile 20 such that they are distributed throughout the height of the latter. The ring-shaped connection terminals 22 therefore each have a diameter that is substantially equal to the outside diameter of the cylindrical pile 20, and have a common axis ZZ' (which also corresponds to the axis of the cylindrical pile 20).

In the examples described herein, the ring-shaped connection terminals 22 correspond to:
- 3-phase very high voltage (VHV) supply, whereby the connection terminals (located in the lower portion of the pile 20 in FIG. 1) are compatible for use with a voltage of up to 47 kVrms and a current of up to 630 Arms per phase;
- 1 three-phase low voltage (LV) supply, formed from 3 line terminals and 1 neutral terminal compatible for use with a voltage of up to 380 Vrms and a current of up to 50 Arms.

Figure 2:
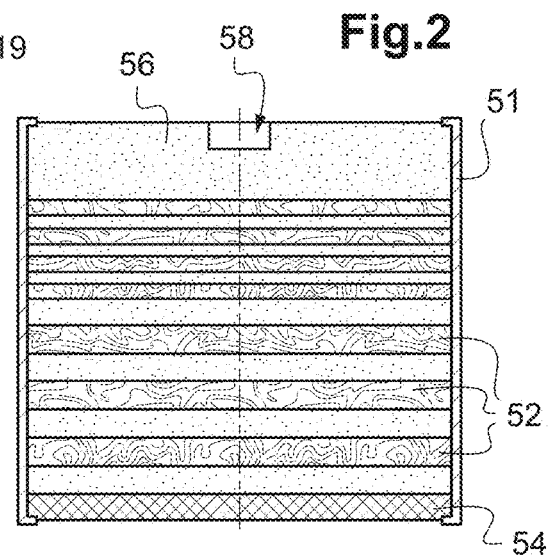
FIG. 2 is a sectional view of the connector in FIG. 1.

As shown in FIGS. 1 and 2, a receptacle 18 comprising a conical portion is secured to the lower connector half 10 so as to define a space for receiving the upper connector half 30 around the central pile 20.

The upper connector half 30 comprises a body 32 having an overall frustoconical outer shape, intended to engage with the conical portion of the receptacle 18 when the upper connector half 30 is assembled with the lower connector half 10, as described hereinbelow.

The upper connector half 30 further delimits a housing 34, in this case cylindrical, opening downwards when the upper connector half 30 is in the position in which it is assembled on the connector half 10.

The upper connector half 30 comprises a pile 40, which extends from a (flat) bottom wall 35 of the housing 34 and ends at the free end thereof in a tip 44; in the assembled position of the upper connector half 30, the bottom wall 35 extends substantially horizontally and the pile 40 is therefore vertical, pointing downwards, and is located away from the cylindrical pile 20.

The pile 40 is in this case a cylindrical pile, the outer surface of which bears the ring-shaped connection terminals 42, distributed throughout the height of the pile 40.

The diameter of the ring-shaped connection terminals 42 is therefore equal to that of the cylindrical pile 40 and the ring-shaped connection terminals 42 are thus coaxial about an axis corresponding to the axis of the cylindrical pile 40, in this case parallel to (and separate from) the Z-Z' axis of the cylindrical pile 20 of the lower connector half 10.

As shown in FIG. 2, in the assembled position of the lower connector half 10 and of the upper connector half 30, each ring-shaped connection terminal 42 is located approximately at the same level (at the same height, i.e. along the ZZ' axis) as a ring-shaped connection terminal 22 of the lower connector half 10.

The upper connector half 30 comprises a channel 36 that extends between the bottom wall 35 of the housing 34 and the upper side 37 of the body 32. As shown in FIG. 2, this channel 36 is designed to receive (in the lower portion thereof) the tip 26 of the cylindrical pile 20 of the lower connector half 10.

Figure 13:
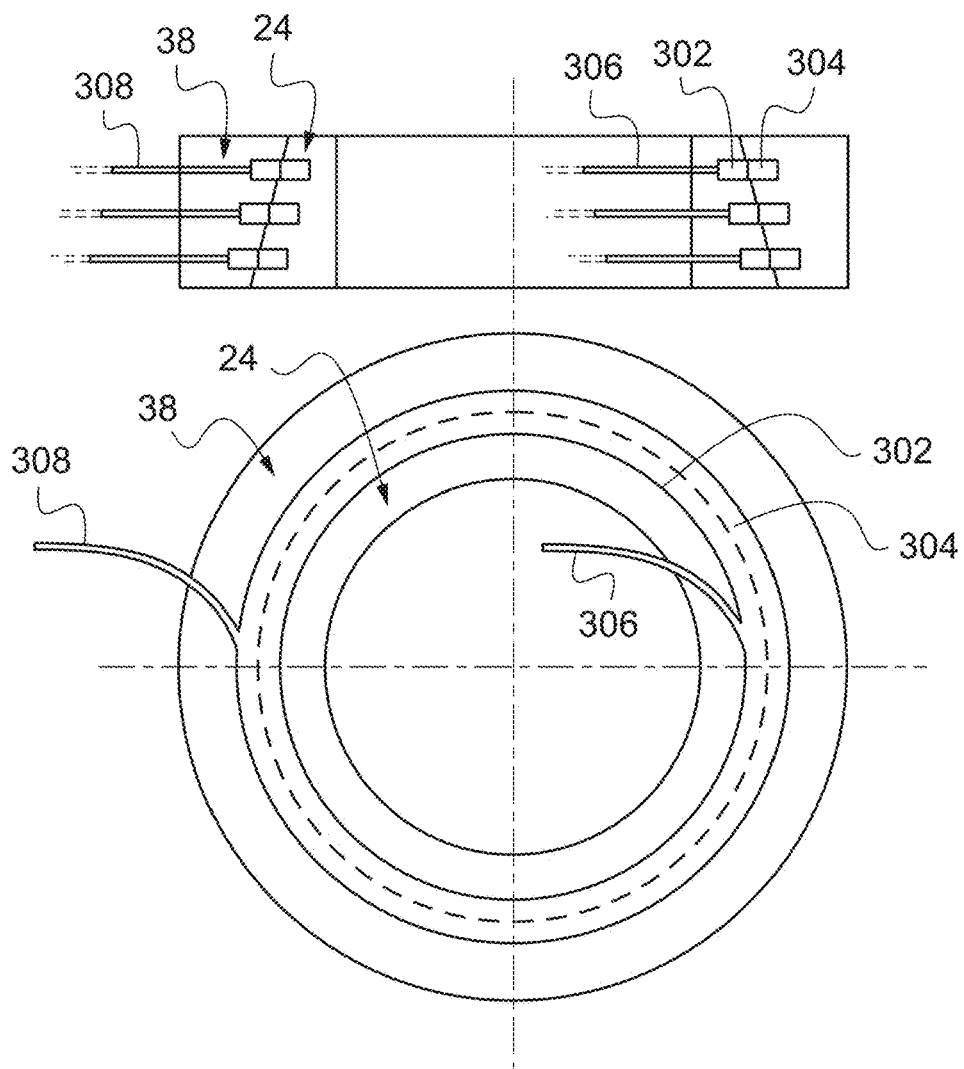
FIG. 13 shows one example of an optical connection system used in the aforementioned connectors.

The upper connector half 30 further comprises a second optical assembly 38, positioned at the centre of the bottom wall 35 of the housing 34 and comprising second ring halves 304 intended to respectively engage with the first ring halves 302 of the first optical assembly 24, as shown in FIG. 13.

The housing 34 of the upper connector half 30 is designed to receive the gel cartridge 50: the gel cartridge 50 has an overall cylindrical shape, the outer dimensions of which correspond to the dimensions of the housing 34.

As stipulated hereinabove, the gel cartridge 50 comprises a rigid outer case 51 mostly filled with an insulating gel 56.

The gel cartridge 50 further comprises conductive gel strips 52, each of which extend in this case throughout the width of the gel cartridge. The different conductive gel strips 52 are distributed over the height of the gel cartridge 50 and the gel cartridge 50 thus comprises, in this embodiment, alternating layers of conductive gel and insulating gel.

The gel cartridge 50 further comprises a cleaning scraping layer 54 located at the lower end of the cartridge 50 and which thus forms the lower side of the gel cartridge 50.

The gel cartridge 50 further comprises, at the level of its upper side, a recess 58, the dimensions of which correspond to the occupancy of the second optical assembly 38 and which is thus designed for receiving said second optical assembly 38 when the gel cartridge 50 is received in the housing 34.

To assemble the underwater connector, the gel cartridge 50 is firstly inserted into the housing 34 of the upper connector half 30, which causes the tip 44 of the cylindrical pile 40 to pierce the gel cartridge. If the gel cartridge 50 is inserted into the housing 34 in an underwater environment, the water initially present in the housing 34 is expelled via the channel 36.

The gel cartridge 50 is pushed into the housing 34 until the upper side of the gel cartridge 50 abuts against the bottom wall 35 of the housing 34. In this position, each ring-shaped connection terminal 42 of the upper connector half 30 is located at the level of a conductive gel strip 52 of the cartridge 50.

The assembly thus formed is seen to be watertight and can thus remain in water awaiting connection with the lower connector half 10 previously deposited on (or secured to) the seabed.

Figure 5:
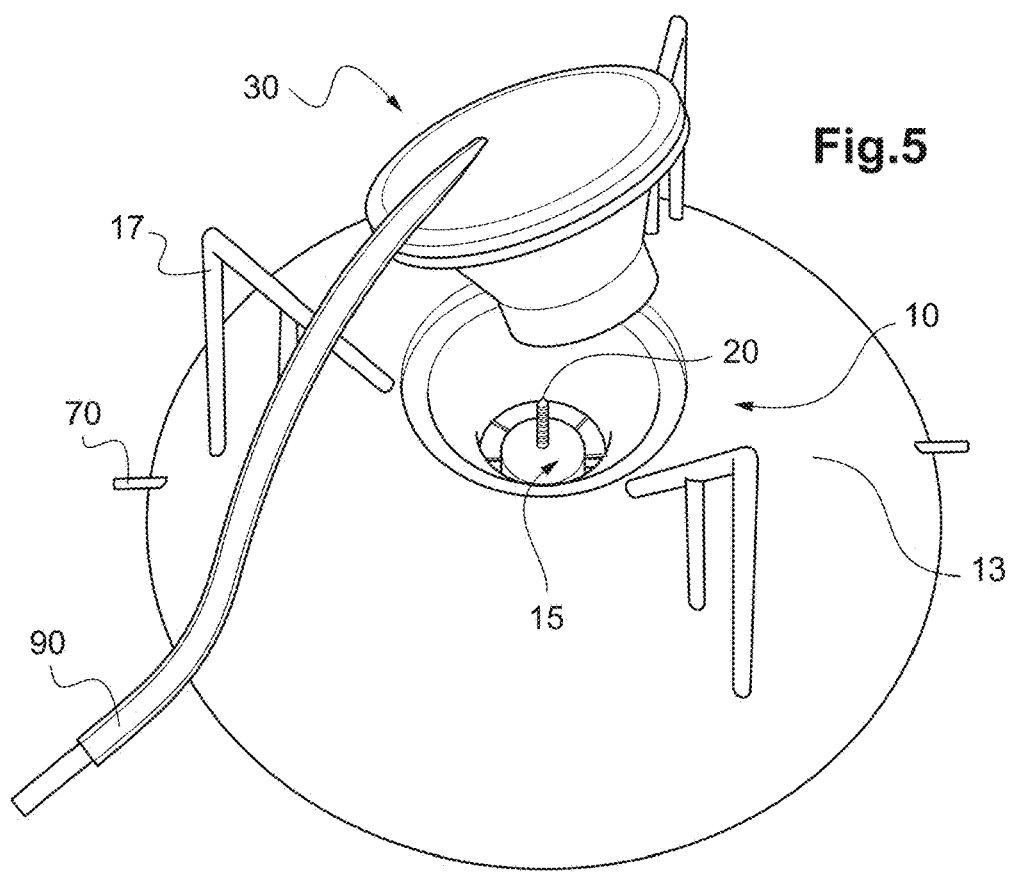
FIG. 5 is a perspective view of the connector in FIG. 1 during the assembly thereof.

The upper connector half 30 is therefore moved towards the lower connector half 10 as shown in FIGS. 1 and 5. The body 32 of the upper connector half 30 is then inserted into the receptacle 18, which causes the cylindrical pile 20 (in particular the tip 26 thereof) of the lower connector half 10 to pierce the gel cartridge 50.

The body 32 of the upper connector half 30 is inserted into the receptacle 18 until the conical portions of the body 32 and the receptacle 18 engage with each other: at this time, as shown in FIG. 2, the connector halves 10, 30 are assembled, the tip 26 of the cylindrical pile 20 is inserted into the channel 36, and each ring-shaped connection terminal 22 of the lower connector half 10 is located at the level of a conductive gel strip 52.

The mass of the upper connector half 30 is seen to ease the piercing of the gel cartridge 50 and help maintain the connector halves 10, 30 in the assembled position.

The forward movement of the gel cartridge 50 during the insertion of the upper connector half 30 into the receptacle 18 is also seen to expel water through the openings 19 provided between the base plate 15 of the lower connector half 10 and the receptacle 18.

Moreover, when inserting the upper connector half 30 into the receptacle 18, the cleaning scraping layer 54 of the gel cartridge 50 travels from the top to the bottom of the cylindrical pile 20 and thus cleans (by scraping) any possible dirt deposited on the ring-shaped connection terminals 22 and on the first optical assembly 24.

Once the two connector halves 10, 30 have been assembled, each connection terminal 42 of the upper connector half 30 is connected to a corresponding connection terminal 22 of the lower connector half 10 via a conductive gel strip 52 (thus forming a conductive track between the connection terminals), which provides the desired electrical connection.

The thickness of the conductive gel strips 52 is designed to be greater than the thickness of each of the connection terminals 22, 42 (in the ZZ' direction) such that the electrical contact will be established between the connection terminals 22, 42, even in the absence of any precise, relative positioning of the two connector halves 10, 30.

There is therefore a certain tolerance regarding the relative positioning of the two connector halves 10, 30, which allows a functional electrical connection to be obtained, which in turn simplifies the assembly process and the mechanical means used to assemble the two connector halves 10, 30.

Figure 4:
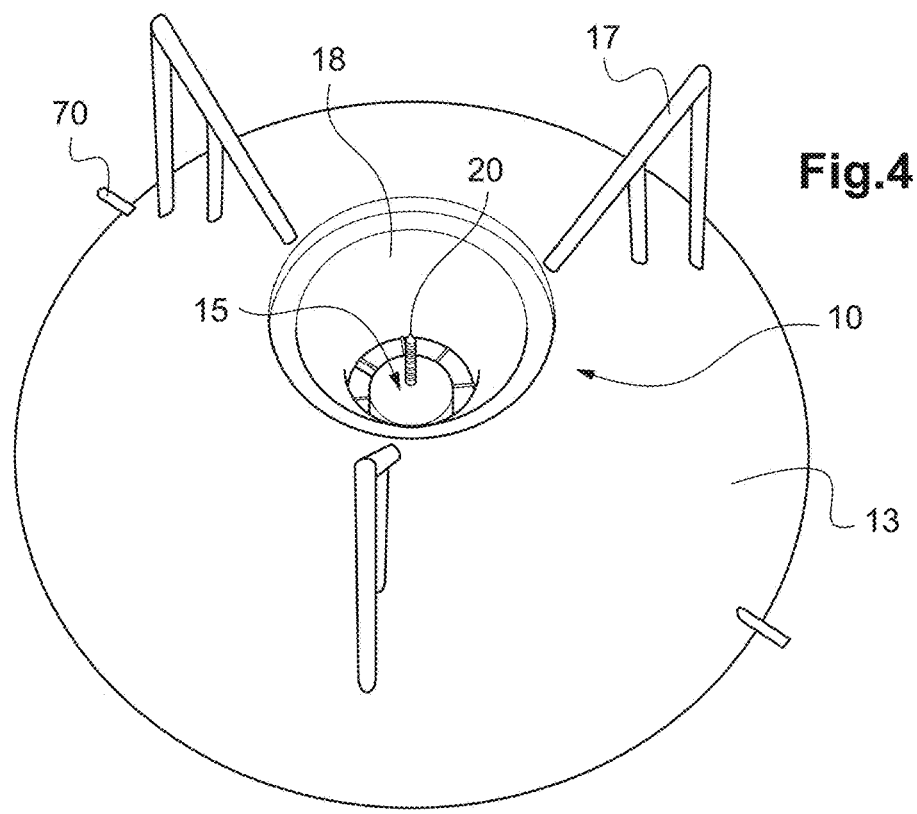
FIG. 4 is a perspective view of a portion of the connector in FIG. 1.

As shown in FIGS. 4 and 5, the lower connector half 10 can be protected by integrating it into a shell 13 (for example made from reinforced concrete) having an upper opening corresponding to the receptacle 18. Guide posts 17 can thus be provided on the upper wall of the shell 13.

The second embodiment will now be described, as presented in FIGS. 7 to 9.

As with the first embodiment, the base 114 comprises a cylindrical wall through which passes the cable 170 and forms the lower portion of a baseplate 115 of the lower connector half 110.

The baseplate 115 of the lower connector half 110 further comprises an upper frustoconical portion 116 which covers the base 114 and the top of which bears a pile 120, in this case conical in shape, the upper end thereof ending in a tip 126.

The outer surface of the conical pile 120 bears a plurality of ring-shaped connection terminals 122 distributed throughout the height of the conical pile 120. The connection terminals 122 are thus coaxial (having the common axis ZZ' corresponding to the axis of the conical pile 120), however have different diameters in pairs, between a maximum diameter for the connection terminal 122 located on the side nearest the baseplate 115 and a minimum diameter for the connection terminal 122 located on the side nearest the tip 126.

The tip 126 of the conical pile 120 houses a first optical assembly 124 comprising a plurality of optical ring halves.

The upper connector half 130 is identical to the upper connector half of the first embodiment described hereinabove with reference to FIGS. 1 to 5: the upper connector half 130 is formed from a body 132 comprising a conical portion designed to engage with the conical portion of a receptacle 118 secured to the lower connector half 110 and delimiting a cylindrical housing 134 intended to receive the gel cartridge 150; the upper connector half 130 further comprises a channel 136 connecting the housing 134 to the upper side of the body 137 (in particular in order to expel water when inserting the gel cartridge 150 into the housing 134) and a second optical assembly 138 comprising a plurality of optical ring halves (intended to respectively engage with the optical ring halves of the first optical assembly 124). The first optical assembly 124 and the second optical assembly 138 are respectively identical to the first optical assembly 24 and to the second optical assembly 38 of the first embodiment, shown in FIG. 13.

The upper connector half 130 further comprises a conical pile 140 that extends downwards from a bottom wall 135 of the housing 134 and ends at the lower end thereof in a tip 144.

The outer surface of the conical pile 140 bears a plurality of ring-shaped connection terminals 142 that are coaxial (along the axis of the conical pile 140), however that have different diameters in pairs, between a minimum diameter for the connection terminal 142 located near to the tip 144 and a maximum diameter for the connection terminal 142 located near to the bottom wall 135.

The ring-shaped connection terminals 142 are respectively connected to electric wires housed in a liftable cable 190 that passes through a wall of the body 132 of the upper connector half 130 in a sealed manner.

Figure 9:
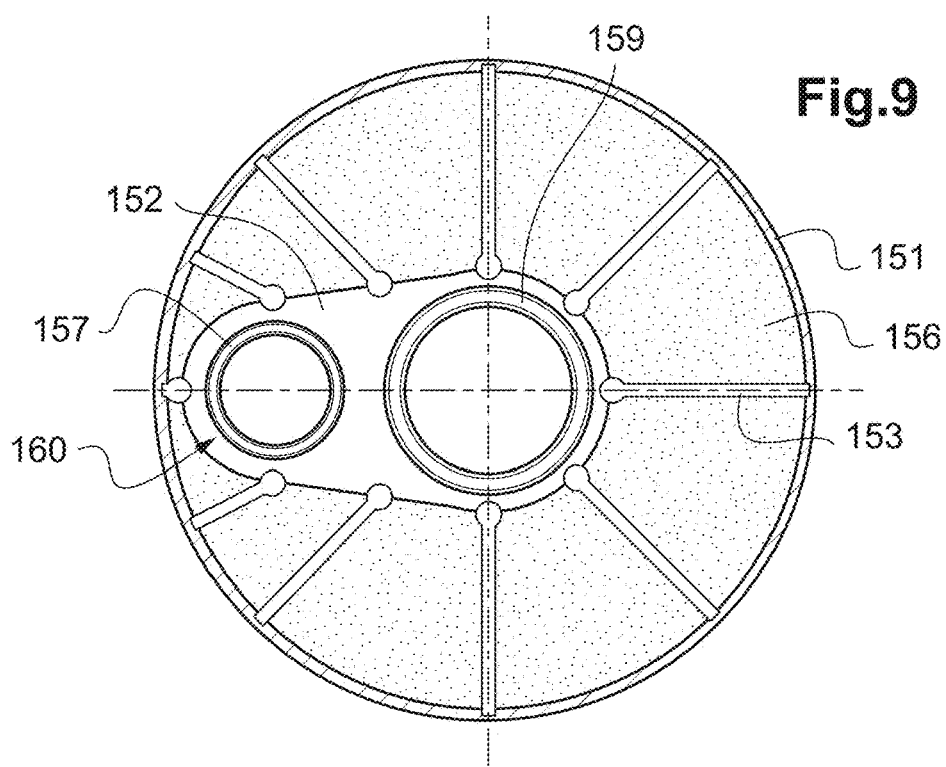
FIG. 9 is a view of a horizontal cross-section of the gel cartridge in FIG. 8.

As shown in FIGS. 8 and 9, the gel cartridge 150 comprises a rigid outer case 151 that delimits a volume mostly filled with an insulating gel 156.

The lower wall of the cartridge 150 is formed by a cleaning scraping layer 154 that extends throughout the width of the cartridge 150 and is held on the perimeter thereof by the rigid outer case 151.

As with the first embodiment, the gel cartridge 150 further comprises, at the level of its upper side, a recess 158, the dimensions of which correspond to the occupancy of the second optical assembly 138 and which is thus designed for receiving said second optical assembly 138 when the gel cartridge 150 is received in the housing 134.

A plurality of connection systems 160 is held in the space delimited by the rigid outer case 151 by means of an elastic structure 155 formed from shock cords (or bungee cords) 153 made from an insulating elastomer: each connection system 160 is connected to the rigid outer case 151 by means of a plurality of shock cords 153 (as shown in FIG. 9); elastic holding elements (contributing to the aforementioned elastic structure 155) can also connect the different connection systems 160 to each other.

Each connection system 160 comprises a first metal toroid (in this case made from copper) 157 and a second metal toroid (in this case made from copper) 159 assembled by a conductive elastomeric plate that in this case surrounds each of the metal toroids 157, 159 and further forms a conductive track between said metal toroids 157, 159.

The metal toroids 157 can be connected to each other by elastic holding means of the elastic structure 155; similarly, the metal toroids 159 can be connected to each other by elastic metal means of the elastic structure 155.

Therefore, the connection systems 160 and the metal toroids 157, 159 that they comprise are suspended in the middle of the space delimited by the rigid outer case 151, by means of the elastomeric elastic structure and, in doing so, are thus submerged in the insulating gel 156.

The two connector halves 110, 130 are assembled according to a method of the same type as that disclosed hereinabove for the first embodiment and illustrated in FIG. 5.

The gel cartridge 150 is firstly installed inside the housing 134 of the upper connector half 130, which causes the conical pile 140 (via the tip 144 thereof) to pierce the gel cartridge 150 and results in positioning each of the metal toroids 157 in contact with a corresponding ring-shaped connection terminal 142.

The metal toroids 157 are positioned on the aforementioned elastic structure such that each is stressed on contact with the corresponding ring-shaped connection terminal 142 by means of the aforementioned elastic structure. For this purpose, the position of the metal toroids 157 in contact with the ring-shaped connection terminals 142 (i.e. after assembly of the gel cartridge 150 and the upper connector half 130) is intended to be located slightly below the resting position thereof in the gel cartridge 150 (as shown in FIG. 8) so as to generate the aforementioned stress phenomenon.

A high-quality electrical contact is also seen to be produced between the toric surface of the metal toroids 157 and the conical surface of the ring-shaped connection terminals 142.

Figure 6:
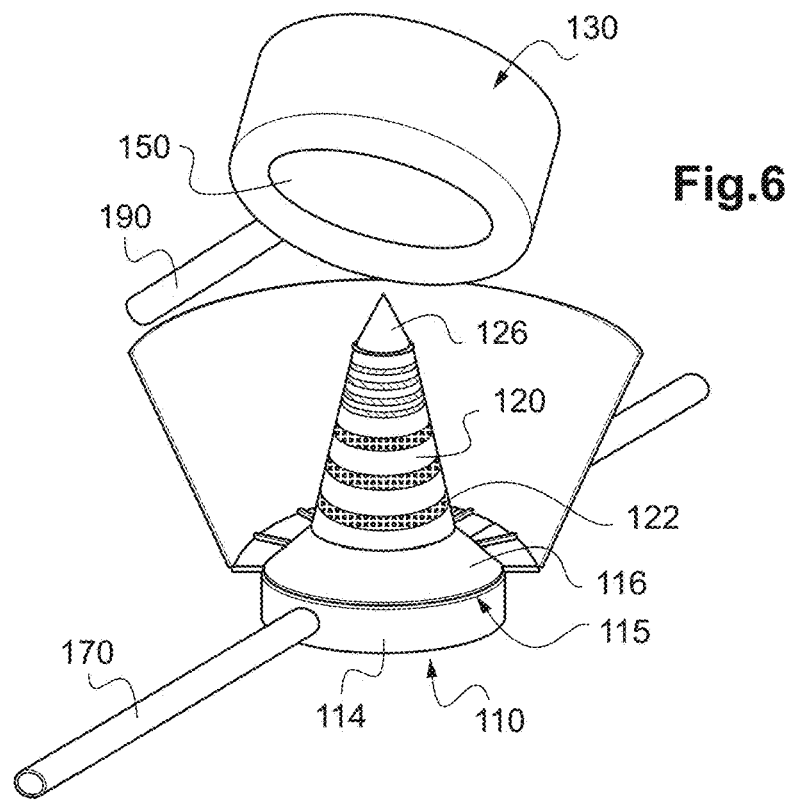
FIG. 6 is a perspective view of a second embodiment of an underwater connector according to the invention.

The upper connector half 130 equipped with the gel cartridge 150 can then be brought above the lower connector half 110, as shown in FIG. 6, then moved downwards under gravity towards the conical pile 120, until said conical pile 120 pierces the gel cartridge 150 (in particular via the tip 126 thereof).

As already stipulated for the first embodiment, the continuation of the downward movement of the assembly formed by the upper connector half 130 and the gel cartridge 150 cleans the conical pile 120 by means of the cleaning scraping layer 154 provided in the lower portion of the gel cartridge 150.

This movement continues until the conical body 132 enters into contact with the conical portion of the receptacle 118, where the two connector halves 110, 130 are in the assembled position thereof.

Figure 7:
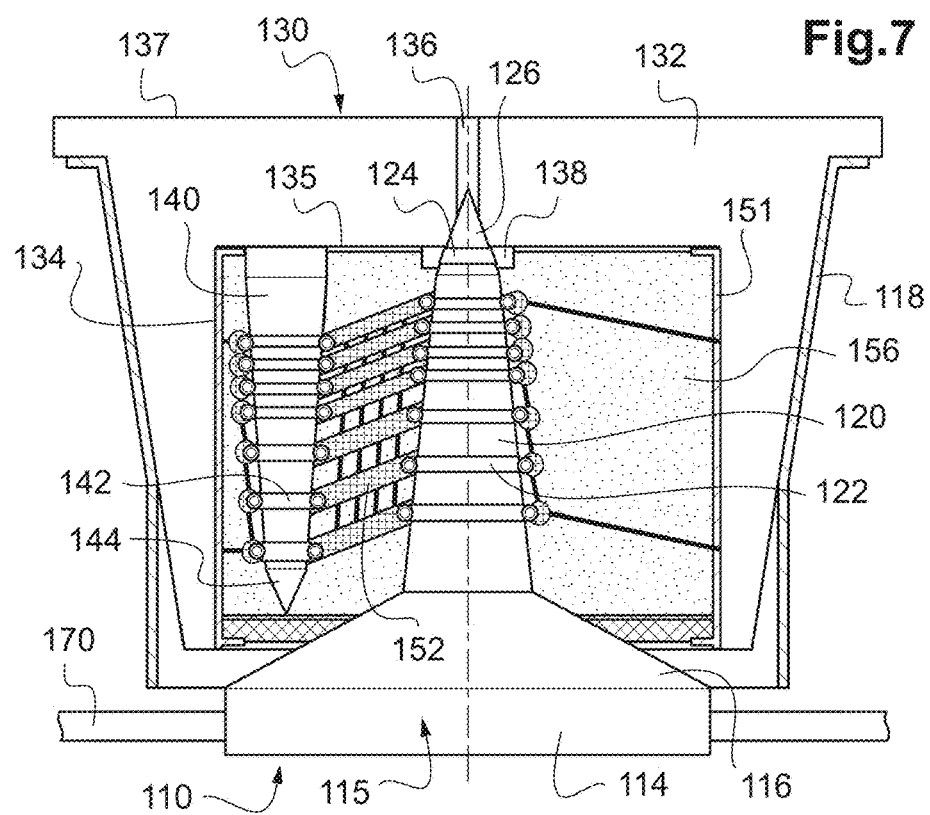
FIG. 7 is a sectional view of the connector in FIG. 6.

In this position, as shown in FIG. 7, each of the metal toroids 159 is brought into contact with a corresponding ring-shaped connection terminal 122 thanks to the stress generated by the deformation of the aforementioned elastic structure.

More specifically, the position of the metal toroids 159 in this assembled state is located above the position of the same metal toroid 159 at rest, as shown in FIG. 8; the movement of the metal toroid 159 into the assembled position of the two connector halves 110, 130 (shown in FIG. 7) allows for the creation (by means of the elastic structure) of a stress, which presses the metal toroid 159 against the corresponding connection terminal 122, which, as stipulated hereinabove, produces a high-quality electrical contact.

Each ring-shaped connection terminal 122 of the lower connector half 110 is therefore in contact with a metal toroid 159, which is itself connected to a metal toroid 157 by means of the plate 152 made from a conductive elastomer, the metal toroid 157 being in contact with a ring-shaped connection terminal 142 of the upper connector half 130: in this manner, an electrical connection is made between a ring-shaped connection terminal 122 of the lower connector half 110 and a corresponding ring-shaped connection terminal 142 of the upper connector half 130.

Again, it can be seen that a precise respective positioning of the lower connector half 110 and the upper connector half 130 is unnecessary, in this case thanks to the elasticity of the elastic structure, which presses the metal toroids 157, 159 against the conical ring-shaped contacts 122, 142 (even in the case of a relatively imprecise positioning of the two connector halves 110, 130).

A third embodiment of the invention will now be described with reference to FIGS. 10 to 12.

In this embodiment, the base 214 comprises a cylindrical side wall through which passes the cable 270 housing the electric wires respectively connected to the connection terminals 222 of the lower connector half 210.

The base 214 also forms part of a baseplate 215 which further comprises an upper, slightly frustoconical portion 216, in this case having a thickness (along the vertical axis ZZ') that is less than that of the base 214 such that the baseplate 215 comprises a flat upper side 217, the surface of which is marginally less than the surface occupancy (along a horizontal plane) of the base 214 and can therefore bear the ring-shaped connection terminals 222.

The connection terminals 222 are also positioned on this upper side 217 in a coaxial manner about the vertical axis ZZ', which in this case constitutes an axis of symmetry and revolution of the baseplate 215 and on which the axial element 220 also extends, which is in this case a centring rod. The connection terminals 222 are therefore in this case concentric.

The upper connector half 230 has a body 232 that has an overall cylindrical outer shape, in which is formed a housing 234, also cylindrical in shape, that opens out into the lower side of the body 232, in this case having a slightly conical shape that complements that of the upper portion 216 of the baseplate 215 of the lower connector half 210.

A channel 236 extends between the housing 234 and the upper side 237 of the upper connector half 230. The channel 236 is centred about the vertical axis ZZ' and has a diameter that is slightly greater than the outside diameter of the centring rod 220 in order to allow said centring rod 220 to pass through it during the assembly of the two connector halves 210, 230.

As with the previous embodiments, the channel 236 also allows water to be evacuated during insertion of the gel cartridge 250 in the housing 234 of the upper connector half 230.

The connection terminals 242 of the upper connector half 230 are positioned on the bottom wall 235 of the housing 234, are directed downwards and are coaxial about the vertical axis ZZ'.

In this embodiment, the connection terminals 222 of the lower connector half 210 and the connection terminals 242 of the upper connector half 230 have a bevelled end that forms knives in order to pierce the gel cartridge 250 as explained hereinbelow.

Moreover, as with the previous embodiments, the lower connector half has a first optical assembly 224, in this case at the level of the centring rod 220, and the upper connector half 230 bears a second optical assembly 238, the first optical assembly 234 and the second optical assembly 238 being located opposite each other when the two connector halves 210, 230 are assembled, as shown in FIG. 13.

The gel cartridge 250 is formed from a plurality of layers held in the rigid outer case 251; the following layers are successively present, listed in order from bottom to top (in the assembled position of the cartridge in the connector as shown in FIG. 11):
  a cleaning scraping layer 254;
  an insulating gel layer 264;
  an insulating gel layer 262 further comprising a plurality of conductive gel rings 252 that are coaxial about the axis of symmetry and revolution of the gel cartridge 250 (which corresponds to the vertical axis ZZ' of the centring rod in the assembled position);
  another insulating gel layer 260.

In this embodiment, said layers are seen to be interrupted at the centre (i.e. at the level of the axis of symmetry and revolution of the gel cartridge 250) in order to form an opening for the passage of the centring rod 220.

However, the diameter of said opening is seen to be less than that of the centring rod 220 in the cleaning scraping layer 254, in order to allow the centring rod to be cleaned when the gel cartridge 250 (previously mounted inside the upper connector half 230) is moved towards the lower connector half 210.

The diameter of the aforementioned opening is slightly greater than that of the centring rod in the insulating gel layers 262, 264. Finally, the diameter of said opening is greater than that of the centring rod 220 in the insulating gel layer 260 in order to form a housing 258 for the second optical assembly 238.

The conductive gel rings 252 each have a diameter that substantially corresponds to the (common) diameter of a connection terminal 222 of the lower connector half 210 and of a connection terminal 242 of the upper connector half 230. More specifically, the outside diameter of each conductive gel ring 252 is slightly greater than the diameter of the corresponding connection terminals 222, 242 (respectively in the lower connector half 210 and in the upper connector half 230) and the inside diameter of each conductive gel ring 252 is slightly lower than the diameter of the corresponding terminals.

In order to assemble the two connector halves 210, 230, the gel cartridge 250 is firstly placed inside the housing 234, such that the ring-shaped connection terminals 242 pierce the gel cartridge 250 and such that the bevelled end thereof is housed inside the associated conductive gel ring 252.

The upper connector half 230 is then moved above the centring rod 220 and moves downwards under gravity towards the lower connector half 210, whereby the centring rod 220 passes through the channel 236.

This movement continues until the upper connector half 230 enters into contact with the lower connector half 210, in this case by engagement of the aforementioned conical surfaces.

During the final stages of this movement, the gel cartridge 250 enters into contact with the connection terminals 222 of the lower connector half 210, which causes each of the connection terminals 222 to pierce the gel cartridge 250. The lower connector half 210 is seen to comprise passages (not shown) for evacuating the water expelled by the gel cartridge 250 and the upper connector half 230 when the latter move towards the lower connector half 210.

When the two connector halves 210, 230 are assembled as shown in FIG. 11, the upper end of each of the connection terminals 222 of the lower connector half 210 is also housed in the corresponding conductive gel ring 252. An electrical connection is thus made between each connection terminal 222 of the lower connector half 210 and the corresponding connection terminal 242 of the upper connector half 230 via one of the conductive gel rings 252.

Thanks to the width of the conductive gel rings 252 (this width corresponding to the difference between the outside diameter and the inside diameter thereof), the electrical connection between each connection terminal 222 of the lower connector half 210 and the corresponding terminal 242 of the upper connector half 230 is effective, even without the relative precise positioning of the connector halves 210, 230.

FIG. 13 shows an optical connection system formed from the first optical assembly 24 and the second optical assembly 38 in FIG. 2.

As stipulated hereinabove, the first optical assembly 24 comprises a plurality of first optical ring halves 302 respectively located opposite second optical ring halves 304 of the second optical assembly 38 when the two connector halves 10, 30 are assembled.

In the embodiment described here, the first optical assembly 24 has a frustoconical outer shape intended to engage with the complementary frustoconical shape of a housing of the second optical assembly 38, which enables the first optical ring halves 302 and the second optical ring halves 304 to be positioned relative to each other.

An optical fibre 308 (contained in the liftable cable 90 or connected to an optical fibre of the liftable cable 90) is connected to every second ring half 304 of the second optical assembly 38. Similarly, an optical fibre 306 (contained in the ocean bottom cable 70 or connected to an optical fibre of the ocean bottom cable 70) is connected to every first ring half 302 of the first optical assembly 24.

An optical fibre 306 originating from the ocean bottom cable 70 is thus connected to an optical fibre 308 originating from the liftable cable 90 via the joining of two ring halves 302, 304.

The invention claimed is:

1. An underwater connector half configured to be assembled with a complementary connector half along a direction of assembly, the underwater connector half comprising:
   a base; and
   at least two electrical connection terminals respectively connected to two electric wires received in at least one cable, the two electrical connection terminals being ring-shaped and coaxial with respect to each other about an axis extending along the direction of assembly,
   wherein the base has a side wall that is parallel to said axis, and
   said cable passes through the side wall.

2. The underwater connector half according to claim 1, wherein the electrical connection terminals are located on the outer surface of an axial pile.

3. The underwater connector half according to claim 2, wherein the axial pile is cylindrical.

4. The underwater connector half according to claim 2, wherein the axial pile is conical.

5. The underwater connector half according to claim 2, wherein the axial pile has a tip-shaped free end.

6. The underwater connector half according to claim 1, wherein the electrical connection terminals are concentric.

7. The underwater connector half according to claim 6, further comprising a centering rod extending along said axis.

8. The underwater connector half according to claim 1, further comprising an optical connection system connected to an optical fiber received in said cable.

9. The underwater connector half according to claim 8, wherein the optical connection system comprises at least one first optical ring half configured to engage with a second optical ring half of the complementary connector half.

10. An underwater connector comprising:
    the underwater connector half according to claim 1,
    wherein said complementary connector half and a gel cartridge are inserted between said underwater and complementary connector halves.

11. The underwater connector according to claim 10, wherein the gel cartridge is housed in a housing formed in a body of the complementary connector half.

12. The underwater connector according to claim 10, wherein the electrical connection terminals are located on the outer surface of an axial pile, and
    wherein the gel cartridge is pierced by the axial pile.

13. The underwater connector according to claim 10, wherein the electrical connection terminals are concentric, and
    wherein the gel cartridge is pierced by the electrical connection terminals.

14. The underwater connector according to claim 10, wherein the complementary connector half comprises an electrical connection terminal,
    wherein the gel cartridge comprises at least one conductive track submerged in an insulating gel, and
    wherein an electrical connection is made between the electrical connection terminal of the complementary connector and one of said two ring-shaped electrical connection terminals via the conductive track.

15. The underwater connector according to claim 14, wherein the conductive track is formed by a conductive gel.

16. The underwater connector according to claim 15, wherein the conductive track is formed by a layer of conductive gel inserted between two layers of insulating gel.

17. The underwater connector according to claim 15, wherein the conductive track is a ring made of conductive gel submerged in the insulating gel.

18. The underwater connector according to claim 14, wherein the conductive track is formed by a conductive elastomer.

19. The underwater connector according to claim 18, wherein a metal toroid in contact with the conductive track is placed in contact with said ring-shaped electrical connection terminal.

20. The underwater connector according to claim 19, wherein the conductive track and the metal toroid are mounted on an elastic structure submerged in the insulating gel.

* * * * *